Aug. 26, 1947.     E. C. THOMSON     2,426,252
SYSTEM OF FLAT ELECTRODES
Filed Jan. 13, 1944
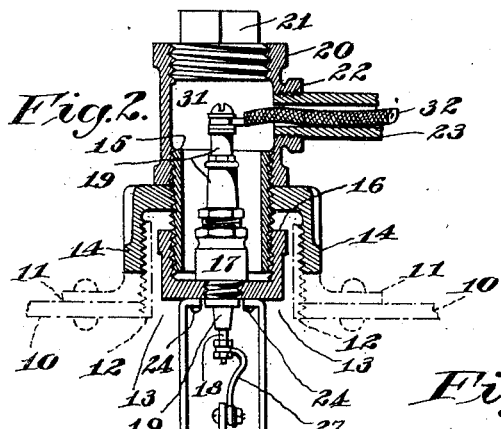
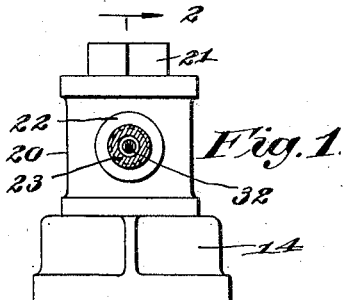
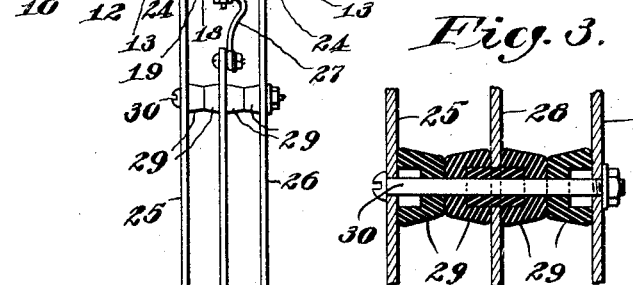
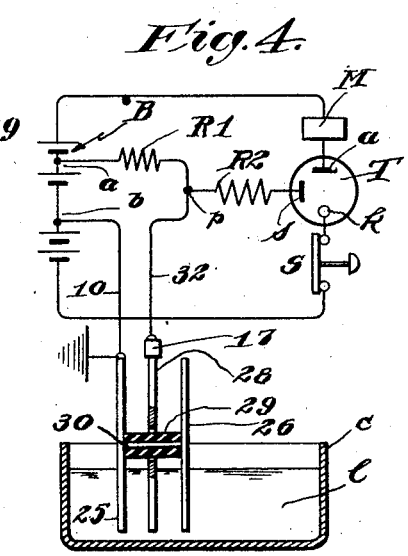
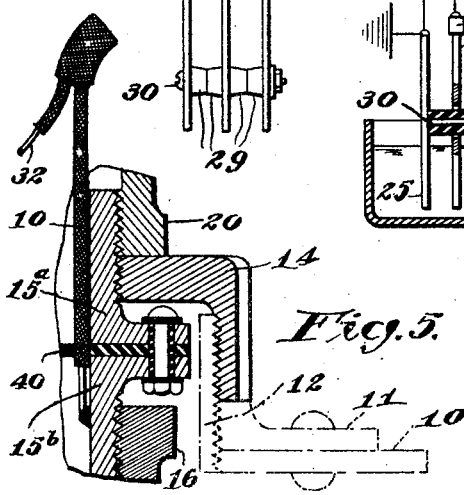
Inventor
E. Craig Thomson
by [signature]
Attorney Patented Aug. 26, 1947

2,426,252

UNITED STATES PATENT OFFICE 2,426,252

SYSTEM OF FLAT ELECTRODES

E. Craig Thomson, Boston, Mass., assignor to Photoswitch, Incorporated, Cambridge, Mass., a corporation of Massachusetts Application January 13, 1944, Serial No. 518,131

2 Claims. (Cl. 200—152)

My present invention relates to electrical detectors and more particularly to electrode systems for use in electric circuits for detecting the position of material in containers, this material affecting an electrical property, such as ohmic resistance or capacity, of the electrode system.

Containers of various sizes, types and capacities are employed to hold fluids, powders and the like of continually changing volume, such as in steam boilers, oil tanks, or silos for powdered chemicals; the maintenance of certain levels in such containers, and hence the detection of the prevailing level, is of utmost importance.

The electrode system according to the invention is designed to indicate by electrical means the presence or absence of material at a predetermined point such as its level in a container, and may be associated with any electrical apparatus suitable for the purpose of operating signaling devices, or electrical relays controlling feed pumps, valves and the like. Electrode devices of this type may be used in supervisory circuits wherein they constitute probes for detecting a variable ohmic resistance or a varying capacitance, the material to be supervised varying an electrical property of the electrode system.

One of the principal objects of my invention is to provide an improved electrical probe of the above-mentioned type; another object is to provide a probe of a construction which permits free flow of viscous or powdered materials between the electrode members; another object is to provide a probe so constructed as to be insensitive to stray electrical effects and to slight dimensional variations; and a further object is to provide an improved electrical probe connector housing and electrode connector plug with outer closing member, these members being mounted in a manner facilitating installation and repair work.

Other objects and novel features of the construction and operation of the device according to the present invention will be apparent from the following description of a practical embodiment thereof by way of illustration. The description refers to a drawing in which Fig. 1 is a side elevation of the electrode system, a portion of which is shown in cross-section;

Fig. 2 a vertical cross-section taken on line 2—2 of Fig. 1, some portions being shown in elevation and others broken off, dot-and-dash lines indicating the container mountings to which the electrode and housing elements are attached;

Fig. 3 a cross-section taken on line 3—3 of Fig. 1, illustrating the method of spacing and insulating of the electrodes;

Fig. 4 the diagram of a level indicator incorporating an electrode system according to the present invention; and Fig. 5 a detail of Fig. 2 illustrating the manner in which both electrodes may be insulated from the container.

In the drawings, 10 indicates a portion of the shell of a container at a point where it is desired to insert the probe electrodes. A flange and close-nipple, 11 and 12 respectively, are secured to the container, surrounding the opening 13 through which the electrodes project into the interior of the container.

Attached to the upper end of the close-nipple 12 is the probe housing base member 14 which connects the apparatus to the container and which supports all the other elements of the electrode probe. Threaded in the base member 14 is another nipple 15, the upper end of which extends above the base member 14, the lower end extending into the opening 13 of the container 10.

As shown in Fig. 2, a cap member 16 is threaded to the lower end of the nipple 15 in the base. On cap 16 is mounted an insulating connector plug 17 which is provided with a central conductor member 18 which is insulated from the metallic body portion of the plug 17, by means of a sleeve 19, which may be constructed from ceramic or other suitable type of insulating material.

On the upper threaded end of the nipple 15, and in close contact with the upper face of the base member 14, there is attached the connector housing 20. This connector housing 20 is in the nature of a T-fitting being provided with a closure plug 21, and a side outlet 22 in which is mounted the electrical conduit 23.

On the bottom face of the cap member 16 are attached, by means of the screws 24, electrode plates 25 and 26 at either side of the central connector 18 of plug 17.

Attached to the lowermost end of the electrical connector member 18, is a flexible electrical conductor 27 which is connected to a central electrode plate 28 which is supported in parallel relationship with the electrode system formed by the two outside electrode plates 25 and 26.

Separating the electrode plates 25, 26 and 28 are insulating spacing members 29, better illustrated in Fig. 3, which shows how the plates 25 and 26 may be directly connected by means of the bolts 30 which in turn are insulated from the central plate 28. The two electrode plates 25 and 26 may, if preferred, be constructed as one unit.

The plates 25 and 26, together with the housing members, may be normally kept at ground potential in which case the plates 25 and 26 provide an electrostatic screen for the plate 28, shielding plate 28 from external electric fields which might affect the operation of the detecting device, especially if the electrodes are employed as plates of a condenser system. It will also be apparent that a slight misalignment of the center plate with respect to the outer plates has a negligible effect on the resistance or capacitance, since the increase in resistance or capacitance on one side tends to offset the decrease on the other.

In the upper portion of the probe housing it will be noted that the combination of cap member 16, the nipple 15, and the plugged connector housing 20 combine to produce a weather-protected chamber 31, in which the electrical conductor wire 32 is attached to the upper end of the conductor 18.

The members 15, 16, 20 and 21, comprising the elements forming the chamber 31, are of symmetrical design with a common axis, which simplifies the mounting or removal of the connector plug 17. Whenever it becomes necessary to replace the connector plug 17, the housing plug 21 is removed and the electrical conductor wire 32 released. The flexible connector 27 is then detached from the conductor member 18 after which a socket wrench may be inserted through the opening, which is normally occupied by the plug 21, in the connector housing 20, and the connector plug 17 may then be unscrewed from the cap member 16, and removed.

The above-described electrode system may be advantageously employed in supervisory circuits such as disclosed and claimed in my copending application Serial No. 518,127, filed January 13, 1944; an installation of this type will now be shortly described with reference to Fig. 4.

In Fig. 4, a battery B having intermediate taps $a$, $b$, supplies the output circuit of a gas-filled cold cathode tube T with anode $a$, cathode $k$ and starting electrode $s$. In the anode circuit may be connected a signaling or relay device M, and a resetting switch S. Connected to taps $a$ and $b$ are in series a resistor R1, electrode 28, and electrode 25, 26, 30 with liquid $l$ in container $c$ therebetween.

From a point $p$ between resistor R1 and probe wire 32, a connection containing limiting resistance R2 leads to control electrode $s$.

Under normal conditions, a current flows in circuit $a$—R1—32—28—liquid—25—10—$b$, and the voltage drop in resistance R1 is such that the potential of point $p$ and starter $s$ is insufficient to render tube T conductive.

If the liquid level sinks below the bottom of electrodes 25, 26, 28, the above-traced circuit is interrupted, the potential of point $p$ rises to approximately that of $a$, the tube starts to conduct and device M is energized and remains so until resetting switch S is opened. An arrangement for similarly detecting a high level is described in the above application; in that instance the bottom of the electrode system is normally above the liquid level.

Operation of the electrode system as a detecting condenser depends upon the disposition of dielectric material between the electrode elements constituting the plates of a condenser, the condenser capacitance changing as the level of the material rises or falls.

It will be noted from an inspection of the drawings that materials of a slow-flowing nature, such as tar products or large-grained powders and the like, will readily flow between the inner and outer electrodes as the level in the container changes. With materials of these types, and especially if the conductivity of the material is low, it is often advantageous to insert the electrode horizontally from the side of the vessel with the lower edges of the plates facing the material. Since a greater area of the plates is affected by the change in level, the change in electrical properties, and, therefore, the response of the circuit, is more rapid.

If the outer electrode couple, for example 25 and 26 as indicated in Fig. 4, is at ground potential, an electrostatic shield around the entire system is provided, which becomes quite important if the difference in electrical characteristics between the material in question and the atmosphere, or between two materials in the same container is so small as to require high sensitivity in the electrical circuit in order to indicate whether the electrode system is immersed in one medium or the other.

If it is desired to keep both electrode elements insulated from the container, an arrangement indicated in Fig. 5 may be used, where 15$a$ and 15$b$ are the halves of a split nipple connecting parts 14, 16 and 20, and 40 is an insulating gasket electrically separating the flanges of 15$a$ and 15$b$. It will be evident that electrodes 25, 26 can in this manner be insulated from the rest of the structure, and separately connected to a wire 10, as indicated in Fig. 5.

It should be understood that the present disclosure is for the purpose of illustration only and that this invention includes all modifications and equivalents which fall within the scope of the appended claims.

I claim:

1. An electrode system for use in an electrical circuit associated with a container, comprising a connector housing including a base, a nipple mounted in said base, a cap member attached to the inner end of said nipple, a closing member attached to the outer end of said nipple and being provided with an orifice for admitting an electrical conductor wire, and a removable closure means located in said closing member above said orifice; an insulating connector mounted in said cap member; a conductor leading through said connector; a probe plate electrically connected to said conductor; a second probe plate parallel with said first plate and fastened to said housing; and electrical insulators separating said plates and fastening them together, said closure means providing access to the outer end of said conductor for attaching it to said wire.

2. An electrode system for use in an electrical circuit associated with a container, comprising a probe connector housing adapted to be fastened to said container and having an outer opening and an inner opening aligned with said outer opening, a connector plug mounted in alignment with said openings and closing said inner opening, means for closing said outer opening, and permitting access to and removal of said plug, a conductor leading through and insulated within said plug, a probe plate attached to said housing, a second probe plate electrically insulated from and attached to said first plate, a flexible connection between said second plate and the inner end of said conductor, and electrical connecting means at the other end of said conductor, opposite said closing means.

E. CRAIG THOMSON.

REFERENCES CITED

The following references are of record in the file of this patent:

UNITED STATES PATENTS

| Number | Name | Date |
| --- | --- | --- |
| 1,049,952 | Walton | Jan. 7, 1913 |
| 2,127,084 | Ogilvie et al. | Feb. 2, 1915 |
| 2,073,268 | Ray et al. | Mar. 9, 1937 |
| 824,098 | Dawes | June 26, 1906 |